INVENTOR.
RAYMOND E. ZENNER

Feb. 6, 1968     R. E. ZENNER     3,368,133
CLOSED LOOP MOTOR CONTROL
Filed May 21, 1965                                                9 Sheets-Sheet 2
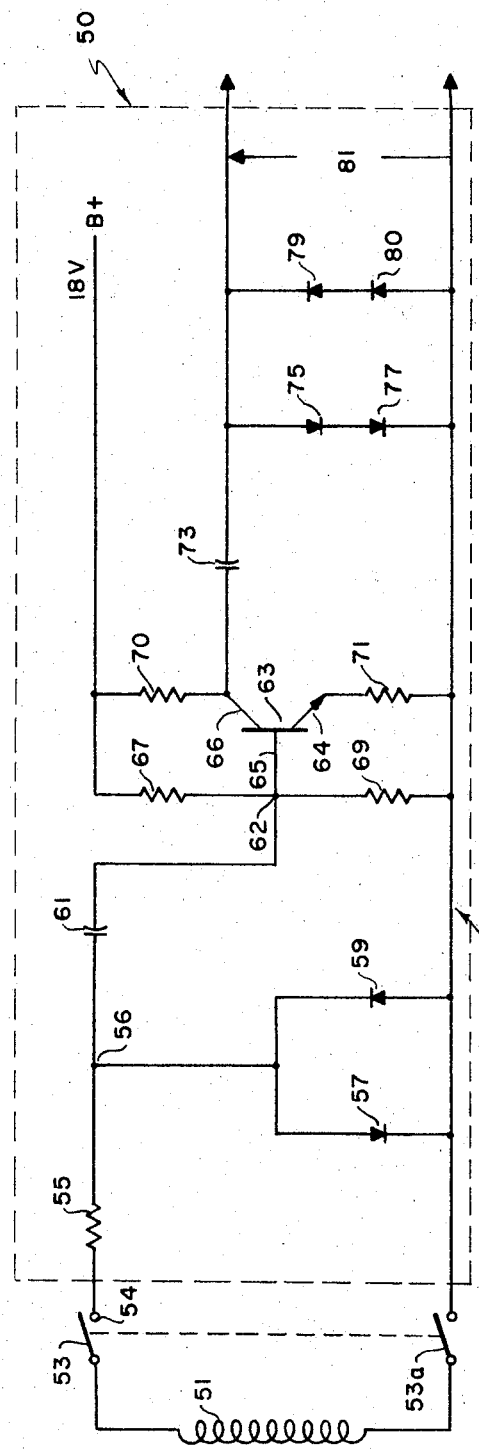
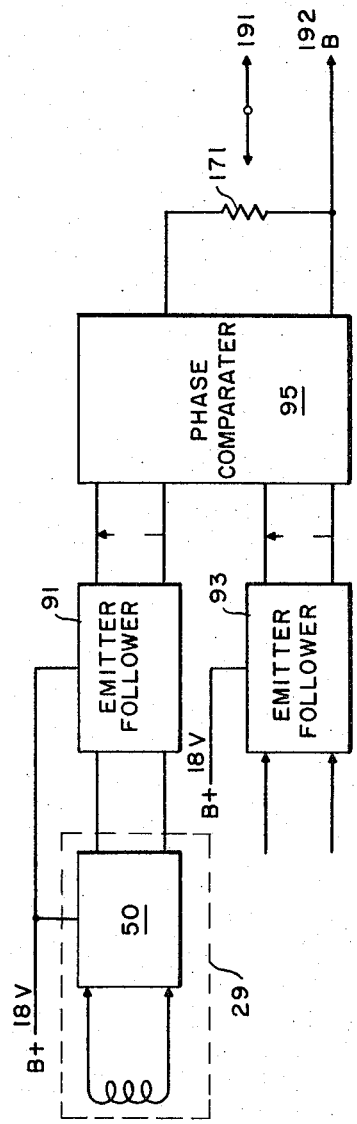
INVENTOR.
RAYMOND E. ZENNER
BY
ATTYS.

INVENTOR.
RAYMOND E. ZENNER
BY
ATTYS.

INVENTOR.
RAYMOND E. ZENNER
BY
ATTYS.

United States Patent Office 3,368,133
Patented Feb. 6, 1968

3,368,133
CLOSED LOOP MOTOR CONTROL
Raymond E. Zenner, Glenview, Ill., assignor, by mesne assignments, to the United States of America as represented by the Secretary of the Navy
Filed May 21, 1965, Ser. No. 457,883
12 Claims. (Cl. 318—231)

The present invention relates to an automatic motor control system and more particularly to a motor control system for a three phase induction motor which is utilized to drive a drum at ninety r.p.m. without any form of speed reducer.

Prior art system for driving eighteen inch diameter magnetic recording drums utilized a single phase synchronous motor with gear reducers or other speed reducing means. Single phase motors powered at 60 c.p.s. deliver 120 torque pulsations per second. Torque actually drops to zero between these pulses. Inertia may make the motor appear to run smoothly, but the force pulsations still exist and are capable of exciting machine frame vibrations. Similarly, the very best gears minimize but do not entirely eliminate vibrations generated by tooth to tooth contact.

The present invention eliminates or greatly reduces the vibration caused by the torque pulsations in magnetic drum driving systems by using a three phase motor having overlapping pulsations. Additionally, the present invention does not require any speed reducing means thereby eliminating the vibration and difficulties inherently present in the speed reducing means. The invention utilizes a three phase induction motor for driving the magnetic drum at ninety r.p.m. A three phase power supply is provided for supplying the power to the motor. The motor is provided with a generator which is attached to the armature for generating a signal which is indicative of the rotational speed of the motor. A frequency standard is provided for generating a standard frequency for comparison with the signal generated by the generator which is attached to the armature of the motor. Alternatively if an external standard frequency is available it may be utilized and the standard frequency generator may be eliminated. A comparison network is provided for comparing the standard frequency with the signal generated by the generator which is attached to the armature for generating an error signal. The error signal is supplied to the power supply for controlling the frequency of the three phase power supplied. The speed of the three phase motor is dependent on the frequency of the three phase power supplied to the motor.

An object of the invention is to provide a motor for driving a magnetic drum without the use of any speed reducing means.

A further object of the invention is to provide a motor for driving a magnetic drum having substantially no drift.

Another object of the invention is to provide a motor for driving a magnetic drum having substantially no speed oscillations or hunting.

Still another object of the invention is to provide a motor for driving a magnetic drum having substantially no machine frame vibrations.

Still a further object of the invention is to provide a motor for driving an eighteen inch magnetic drum.

Still another object of the invention is to make a three phase induction motor operate in a synchronous mode.

A still further object of the invention is to provide a control system for an induction type motor which is capable of utlizing the sixty cycle current signal supplied by the local power company as a standard frequency source for the motor.

Other objects and many of the attendant advantages of this invention will be readily appreciated as the same becomes better understood by reference to the following detailed description when considered in connection with the accompanying drawings wherein:

FIG. 2 is a circuit diagram of a suitable tone wheel clipper circuit which is used in a preferred form of the invention;

FIG. 3 is a block diagram of a circuit illustrated in FIGS. 2 and 4;

Figure 1:
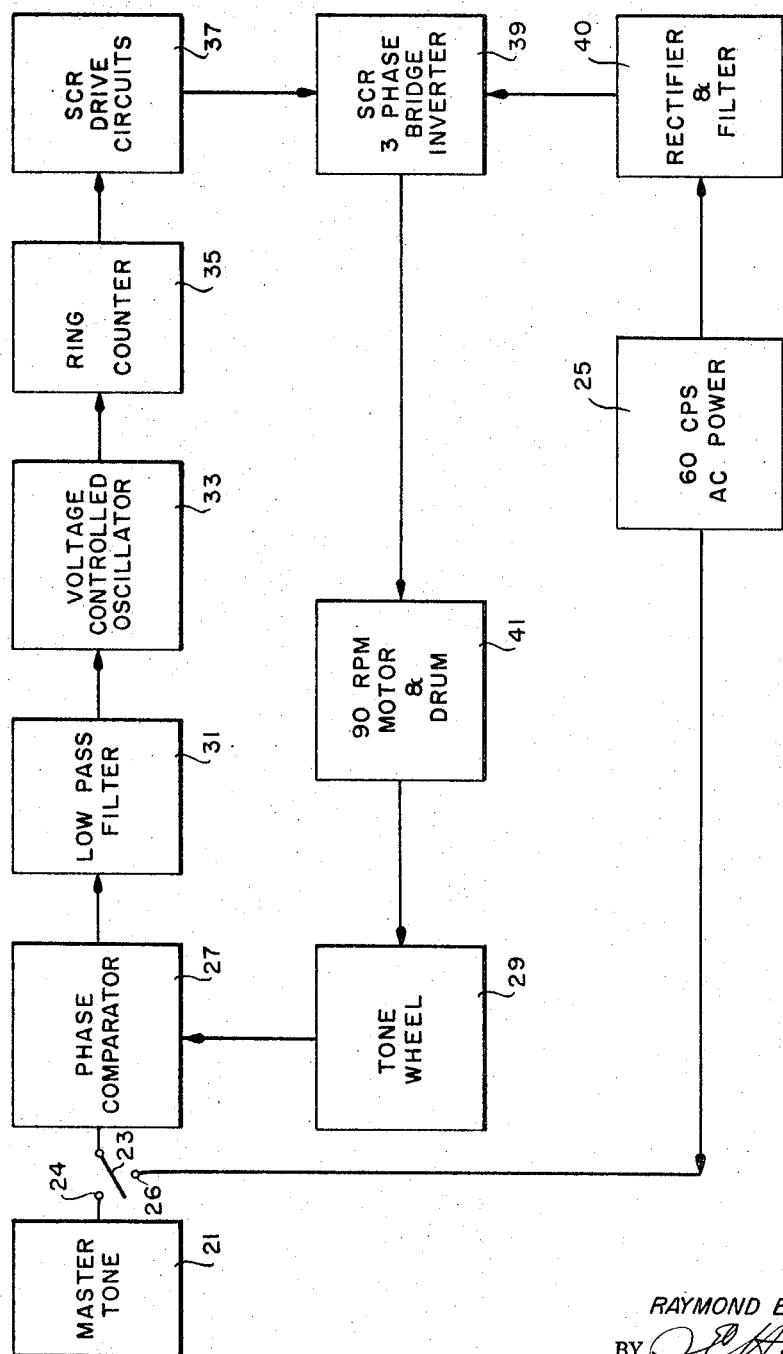
FIG. 1 is a block diagram of a closed loop motor control system in accordance with the invention.

Referring to FIG. 1 a master tone oscillator 21 is provided for generating a 60 cycle signal and is an extremely stable and accurate oscillator. A phase comparator 27 has one of its inputs connected by way of a switch 23 to either input 24 which is connected to the master tone oscillator 21 or alternately to switch position 26 which is connected to a 60 cycle per second AC power source 25. The 60 cycle per second power may be derived from a local outlet from the local power company. The second input of the phase comparator 27 is connected to the output of the tone wheel generator 29. The output of the phase comparator is a DC signal which is supplied to a low pass filter 31 for filtering out the unwanted AC components present in the output of the phase comparator. The output of the low pass filter 31 is supplied to a voltage controlled oscillator 33. The output of the voltage controlled oscillator 33 is utilized to run a ring of six counters in a ring counter 35. The output of the ring counter 35 drives the SCR drive circuits 37 which in turn drives the SCR three phase bridge inverter 39. The AC power supply 25 is also connected to a rectifier and filter network 40 for supplying the DC power to the SCR three phase bridge inverter 39. The output of the three phase bridge inverter 39 is supplied to the input of the 90 r.p.m. motor 41. The tone wheel 29 is connected to the rotating armature of the 90 r.p.m. motor for rotating therewith and thereby generating the signal to be compared in the phase comparator.

In order to better understand the operation of the system described in FIG. 1, a description of its components referred to above is first presented. Referring to FIG. 2 a tone wheel is provided on the motor shaft which is not illustrated in the drawings. However, steel tone wheels in the form of a gear having a number of teeth positioned around its periphery for generating pulses or signals every time a tooth passes under the magnetic pick up are well known in the art and need not be described in detail. The tone wheel utilized in the present invention may be of any suitable construction, and for present purposes contains 40 teeth for generating 60 pulses per second as the motor rotates at 90 r.p.m. The magnetic pick up is represented schematically by an inductor 51. The output of the pick up 51 is connected to the input of the tone wheel signal limiting circuit 50.

The tone wheel signal limiting circuit 50 is composed of resistor 55 connected between the switch terminal 54 and a junction point 56. A pair of diodes 57 and 59 are connected in parallel with diode 57 being oppositely poled from diode 59 between junction point 56 and the common bus line 58 of the tone wheel signal limiter circuit 50. A capacitor 61 is connected between the junction point 56 and the base electrode 65 of a transistor 63. The transistor 63 is provided with an emitter electrode 64, a base electrode 65, and a collector electrode 66. The base electrode 65 is connected to the junction 62. A resistor 69 is connected between the junction 62 and the common bus line 58. A second resistor 67 is connected between the junction 62 and an 18 volt source of B+ voltage. A resistor 71 is connected between the emitter electrode 64 of a transistor 63 and the common bus line 58. A resistor 70 is connected between the collector electrode 66 of the transistor 63 and the source of B+ voltage. A capacitor 73 is connected between a collector electrode 66 of the transistor 63 and the output terminals 81. A first pair of diodes 75 and 77 are connected in series across the output terminal 81. A second pair of diodes 79 and 80 reversely poled from the first pair of diodes 75 and 77 are connected in series across the output terminals 81.

FIG. 3 illustrates the connection of the various components comprising the phase comparing part of the system. The tone wheel signal limiter 50 has its output connected to an emitter follower transistor 91. The output of the emitter follower transistor 91 is connected to the input of the phase comparator 95. A second emitter follower transistor 93 has as a source either the master tone oscillator 21 or alternatively the AC power supply of 60 cycles from the local electric company. The output of the emitter follower is connected to the other input of the phase comparator 95. The phase comparator 95 therefore compares the relative phases of the output of the master tone oscillator 21 with the output of the tone wheel generator 29. The output of the phase comparator is taken from terminal B. The components of the emitter followers 91 and 93 are so chosen that the voltage output of the emitter follower 91 is twice the output of the emitter follower 93. The pulses generated by the non illustrated tone wheel in combination with the inductor pickup 51 is representative of the speed of the motor.

The operation of FIG. 2 is as follows, the pulse generated by the combination of the inductor pickup 51 and the nonillustrated wheel are supplied through the closed switch to the tone wheel signal limiter circuit 50. Diodes 57 and 59 limit the excursions of the generator signal to a level which is no greater than their forward conducting break-down potential. The signal present at junction 56 after it has been limited and clipped by diodes 57 and 59 is supplied to the base of amplifier transistor 63 for amplification. The amplified signal is then supplied to the output terminals 81. The diodes 75, 77, 79 and 78 further serve as limiters to limit the output voltage present to the sum of the forward conducting characteristics of the respective diodes which are connected in series. The operation of FIG. 3 will be described in combination with FIG. 4 in which there is illustrated the circuits 91, 93 and 95 in detail.

The emitter follower network 91 has a pair of input terminals 101, a resistor 103, and a capacitor 105 connected in series between one of the input terminals 101 and junction point 107. A transistor 109 having an emitter electrode 110, a base electrode 111, and a collector electrode 112 has its base electrode 111 connected to the junction point 107. A resistor 113 is connected between the 18 volt source of B+ and a junction point 107 and a resistor 115 is connected between the junction point 107 and the common bus line 116. A capacitor 119 is connected between the base electrode 111 of the transistor 109 and the common bus line 116. An output transformer 125 has one end of its primary winding 127 connected to the base electrode 111 of transistor 109. The turns ratios of the various transformer windings are illustrated on the drawings, if they are not in a 1:1 relation. The upper end of the primary winding 127 of the transformer 125 is connected to one end of the resistor 123; and the other end of the resistor 123 is connected to the ground common bus line electrode 116. A capacitor 121 is connected in parallel across the resistor 123.

The second emitter follower circuit 93 has a pair of input terminals 131. A variable potentiometer 113 is connected across the input terminals 131. A capacitor 135 is connected between the center tap 134 of the potentiometer and the junction point 136. A resistor 137 is connected between the junction point 136 and the source of B+ potential. A resistor 129 is connected between the junction point 136 and a common bus line 140. A transistor 141 is provided having an emitter electrode 142, a base electrode 143 and a collector electrode 144 directly connected to the source of B+ potential. The base electrode 143 of transistor 141 is directly connected to the junction point 136. A capacitor 145 is connected in parallel with the resistor 139. The emitter electrode 142 is connected in series with the primary winding 146 of a transformer 147. The other end of the primary 146 is connected to one end of a resistor 150; the other end of resistor 150 is connected to the common bus line 140. A capacitor 149 is connected in parallel with resistor 150. The primary winding 151 of a transformer 153 is connected in parallel with primary 146 and has one end connected to the emitter electrode 142 of transistor 141 and its other end connected to one end of the resistor 150.

The phase comparator circuit 95 comprises a secondary winding 161 of transformer 125 having one of its ends connected to the cathode of diode 163. The anode of diode 163 is connected to a common junction point 166. The other end of the transformer 161 is connected to the cathode of a diode 165. The anode of the diode 165 is connected to a common junction point 188. The secondary winding 164 of the transformer 147 has one of its ends connected to the center tap 162 of winding 161. A first resistor 167 has one end connected to junction 166 the other end of resistor 167 is connected to one end of a resistor 169 the other end of the resistor 169 is connected to junction point 188. The other end of transformer winding 164 is connected to the junction point of resistors 167 and 169. A secondary winding 173 of the transformer 125 has one of its ends connected to the anode of diode 179. The other end of the winding 173 is connected to the anode of diode 181. The cathode of diode 181 is connected to the common junction point 188. A resistor has one of its ends connected to the cathode of diode 179 and its other end connected to one end of resistor 183. The other end of resistor 183 is connected to the junction point 188. A secondary winding 177 of the transformer 153 has one of its ends connected to the center tap 175 of the secondary winding 173 of the transformer 125 and its other end connected to the junction point of resistors 185 and 183. A capacitor 170 has one of its ends connected to the junction point 166 and its other end to the cathode of diode 179. A variable potentiometer 171 is connected in parallel with the capacitor 170. The output terminal 191 is connected to the center tap 190 of the potentiometer 171. The other output of the circuit is taken from terminal 192.

Figure 4:
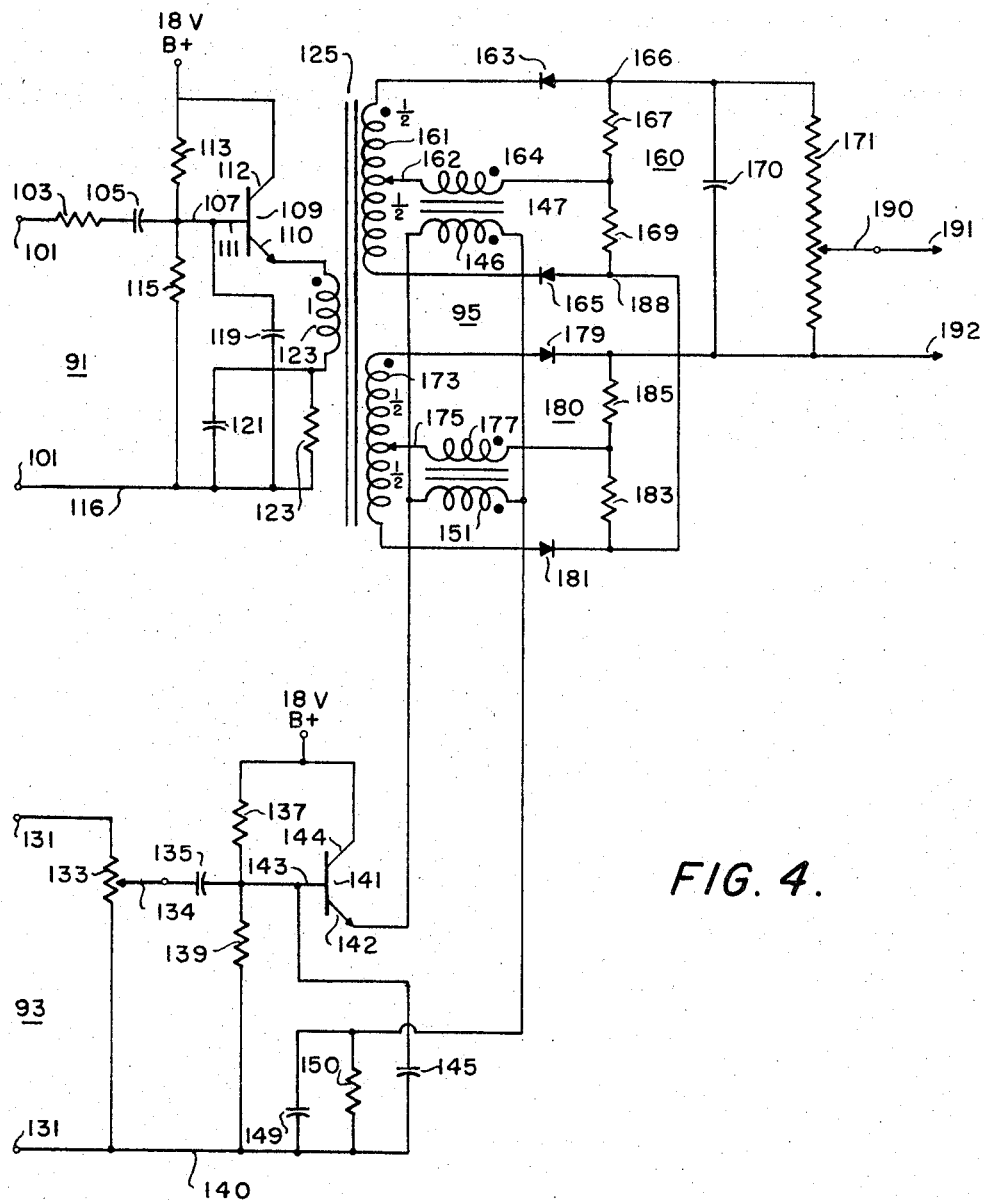
FIG. 4 is a circuit diagram of a suitable phase comparator circuit which is used in a preferred form of the invention.

The operation of the phase comparator illustrated in FIG. 4 is as follows:

The phase comparison sub network 160 comprises transformer winding 127 and 161 of transformer 125, transformer 147, diodes 163 and 165, and resistors 167 and 169. The two voltages to be compared are applied to the transformers 125 and 147. They are added in one half of transformer 125 and subtracted in the other half, and the sum and difference outputs are rectified in diodes 163 and 165. The outputs of the diodes 163 and 165 are applied to the resistors 167 and 169. The voltage $V_1$ having a frequency $f_1$ appearing across the primary winding 127 is twice the voltage $V_2$ of the signal $f_2$ appearing across the primary winding 146. As the frequency of $V_1$ varies relative to the frequency of $V_2$ the phase relationship between $V_1$ and $V_2$ varies.

When the two applied voltages are 90° or 270° apart in phase the rectified outputs are equal and opposite and the combined output is zero. The maximum output is obtained when the two applied voltages are in phase or 180° out of phase and at these points, the polarities of the phase detect or outputs are opposite. The phase comparator 180 operates in a similar fashion as the comparator 160. The output of the comparators 160 and 180 are added together and presented across the capacitor 170.

Figure 5:
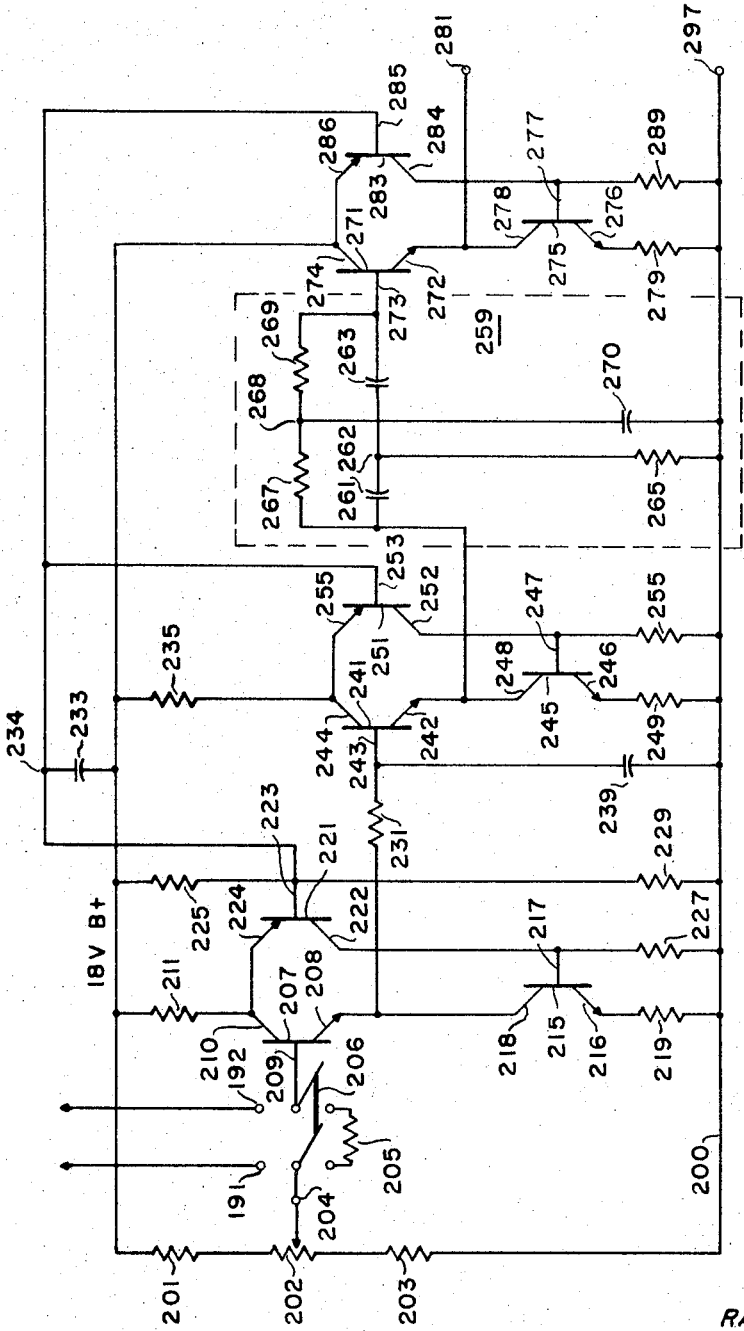
FIG. 5 is a circuit diagram of a suitable low pass filter which is used in a preferred form of the invention.

Referring to FIG. 5, there is illustrated a circuit of the low pass filter 31. The input to the low pass filter is supplied from terminals 191 and 192 of the phase comparator 27. A quick acting double pole double throw switch 206 connects the terminal 191 to the center tap 204 of the potentiometer 202 and the same quick acting switch 206 connects the base electrode 209 of the transistor 207 to the input terminal 192. For reasons which will be evident later the quick switch 206 is provided with a resistor 205 for connection to the resistor when the circuit is in its off condition. A first resistor 201 has one of its ends connected to the 18 volt B+ supply and the other end of resistor 201 is connected to one end of the potentiometer 202. The other end of the potentiometer 202 is connected to one end of a resistor 203. The other end of the resistor 203 is connected to the common bus electrode 200. A first filter transistor 207 having an emitter electrode 208, a base electrode 209, and a collector electrode 210 is connected in an emitter follower configuration. A resistor 211 connects the collector electrode 210 of transistor 207 to the 18 volt B+ supply line. A transistor 215 is provided with an emitter electrode 216, a base electrode 217, and a collector electrode 218 is connected to the emitter electrode 208 of the transistor 207. The emitter electrode 216 of transistor 215 is connected to one end of a resistor 219. The other end of resistor 219 is connected to the common bus line 200.

A third transistor 221 is provided having a collector electrode 222, a base electrode 223, and an emitter electrode 224 connected to the collector electrode 210 of transistor 207. The collector electrode 222 of transistor 221 is connected to the base of the electrode 217 of transistor 215. The base electrode 217 of transistor 215 is connected to one end of a resistor 227. The other end of resistor 227 is connected to the common bus line 200. A resistor 225 has one end connected to the 18 volt B+ supply and its other end connected to the base electrode 223 of transistor 221. A resistor 229 has one of its ends connected to the base electrode 223 of transistor 221 and its other end connected to the common bus line 200. A capacitor 233 is connected between the 18 volt B+ supply and a common bus electrode 234. The common bus electrode 234 is connected to the base electrode 223 of transistor 221. A resistor 231 is connected to the output emitter electrode 208 of transistor 207.

A second emitter follower transistor stage having a transistor 241 provided with an emitter electrode 242, a base electrode 243, and a collector electrode 244 is connected to one end of a resistor 235. The other end of the resistor 235 is connected to the 18 volt B+ supply. The base electrode 243 of the transistor 241 is connected to the other end of resistor 231. A capacitor 239 has one end connected to the common bus line 200. The other end of the capacitor 239 is connected to the base electrode 243 of transistor 241. A transistor 245 having an emitter electrode 246, a base electrode 247, and a collector electrode 248 connected to the emitter electrode 242 of transistor 241. The emitter electrode 246 of the transistor 245 is connected to one end of resistor 249. The other end of resistor 249 is connected to the common bus line 200.

A transistor 251 is provided having a collector electrode 252, a base electrode 253, and an emitter electrode 255, connected to the collector electrode 244 of transistor 241. The base electrode 253 of transistor 251 is connected to the bus line 234. The collector electrode 252 of transistor 251 is connected to the base electrode 247 of transistor 245 and is connected to one end of a resistor 255. The other end of the resistor 255 is connected to the common bus line 200. A T-notch type filter having an exceedingly high rejection level for 120 c.p.s. is provided comprising a first capacitor 261 having one of its ends connected to the emitter electrode 242 of transistor 241. The other end of the capacitor 261 is connected to the junction point 262. A resistor 265 having one of its ends connected to the junction point 262 and its other end connected to the common bus line 200. The second capacitor 263 has one of its ends connected to the common junction point 262. A resistor 267 has one of its ends connected to the emitter electrode 242 of transistor 241 and its other end connected to the junction point 264.

A capacitor 270 has one of its ends connected to the junction point 268 and its other end connected to the common bus electrode 200. A resistor has one of its ends connected to the common junction point 268 and its other end connected to the other end of capacitor 263. An emitter follower transistor 271 has an emitter electrode 272, a base electrode 273, and a collector electrode 274 which is connected to the 18 volt B+ supply.

A transistor 275 having an emitter electrode 276, a base electrode 277, and a collector electrode 278 has its collector electrode 278 connected to the emitter electrode 272 of transistor 271. The emitter electrode 276 of transistor 275 is connected to one of the ends of resistor 279. The other end of resistor 279 is connected to the common bus line 200. A transistor 283 having a collector electrode 284, a base electrode 285, and an emitter electrode 286 connected to the collector electrode 274 of the transistor 271. The base electrode 285 of transistor 283 is connected to the common bus line 234. The collector electrode 284 of transistor 283 is connected to the base electrode 277 of transistor 275. The base electrode 277 of transistor 275 is connected to one end of a resistor 289. The other end of resistor 289 is connected to the common bus line 200.

The output from the low pass filter is taken across the terminals 281 and 297. Terminal 281 is connected to the emitter electrode 272 of transistor 271. The end terminal 297 is connected to the common bus line 200.

The circuit illustrated in FIG. 5 operates as follows:

The input to the filter which is derived from the phase comparator contains an AC component of 120 cycles per second which must be filtered out in order to have a DC signal of interest remaining. This input signal is connected to the base electrode 209 of emitter follower transistor 207. The operation of the emitter follower stages is as follows:

The transistor 216 presents a dynamic impedance as a load on the transistor 207. Therefore, as the current increases in the transistor 207 the current is caused to decrease in the transistor 215. This operation is assured by providing a transistor 221 which senses the conductive condition of transistor 207 and places a signal at the base 217 of transistor 215 which is indicative of the state of conduction of the transistor 207, so that the impedance of transistor 215 increases as the current following through transistor 207 increases.

The above-stated operation of the emitter follower stage assures that reactive loads connected to emitter 208 of transistor 207, and thereby to collector 218 of transistor 215, will display a voltage that accurately follows the voltage applied to base 209 of transistor 207. Ordinary single transistor emitter follower circuits with a fixed emitter resistor exhibit blockage and waveform clipping under reactive output load conditions. The output on the emitter electrode 208 of transistor 207 is fed to the base electrode 243 of transistor 241 of the second emitter follower stage. Capacitor 239 and resistor 231 is an RC filter and is provided across the output of the emitter follower transistor 207 in order to filter out some of the AC components present in the signal. Transistors 241, 245 and 251 operate similarly to transistors 207, 215 and 233 respectively. The output present on the emitter electrode 242 of the emitter follower transistor 241 is supplied in the input of a parallel T-notch filter which has an extremely high rejection for frequencies of 120 c.p.s. The 120 c.p.s. signal rejection factor is 60 db for this network. Therefore, substantially all of the 120 cycles per second component in the signal is eliminated by the filter. The output of the filter is supplied to the base electrode 273 of the emitter follower transistor 271. The output signal for driving the voltage control oscillator is taken from the terminal 281 of the filter.

Figure 6:
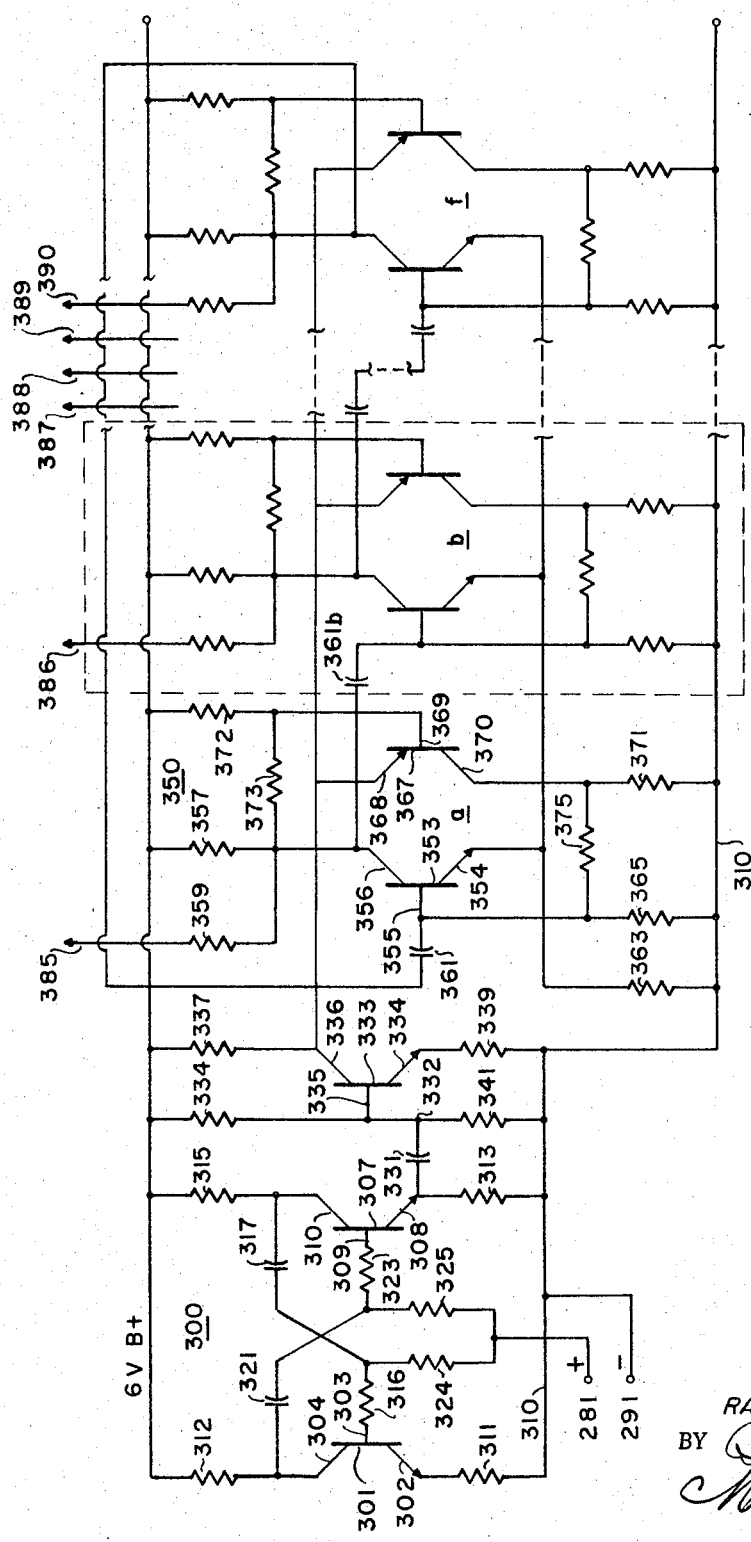
FIG. 6 is a circuit diagram of a suitable six stage ring counter which is used in a preferred form of the invention.

FIG. 6 which illustrates the voltage controlled oscillator 33 and ring counter 35, has a voltage controlleed oscillator 300, ring driver, and a sixth stage ring counter which will be discussed as a single unit. The free running voltage oscillator 300 contains an input terminal 281 and a common bus line terminal 297 which is connected to the identically numbered terminals of the filter illustrated in FIG. 5. A first transistor 301 having an emitter electrode 302, a base electrode 303, and a collector electrode 304 connected to one end of a resistor 312. The other end of resistor 312 is connected to the 6 volt B+ power supply. A second transistor 307 is provided having an emitter electrode 308, a base electrode 309 and a collector electrode 310 connected to one end of a resistor 315. The other end of the resistor 315 is connected to the 6 volt power supply. The collector electrode 304 of transistor 301 is connected to one end of capacitor 321. The other end of capacitor 321 is connected to one end of a resistor 323. A resistor 325 is connected between the common junction of capacitor 321 and resistor 323 and the input terminal 281. The other end of resistor 323 is connected to the base electrode 309 of transistor 307. The collector electrode 310 of transistor 307 is connected to one end of capacitor 317.

The collector electrode 310 of transistor 307 is connected to one end of capacitor 317. The other end of capacitor 317 is connected to one end of resistor 316. The other end of resistor 316 is connected to the base electrode 303 of transistor 301. A resistor 324 has one of its ends connected to the junction of resistor 316 and capacitor 317 and its other end connected to the input electrode 281. A resistor 311 has one of its ends connected to the emitter electrode 302 of transistor 301 and its other end connected to the common bus line 310. The resistor 313 has one of its ends connected to the emitter electrode 308 of transistor 307 and its other end connected to the common bus line 310. A capacitor 331 has one of its ends connected to the emitter electrode 308 of transistor 307 for obtaining the output of the transistor oscillator 303. The other end of capacitor 331 is connected to the common junction point 332.

A transistor 333 is provided having an emitter electrode 334, a base electrode 335 and a collector electrode 336 connected to one end of a resistor 337. The other end of resistor 337 is connected to the 6 volt B+ power supply. A resistor 339 has one of its ends connected to the emitter electrode 334 of the transistor 333 and its other end connected to the common bus line 310. A resistor 341 has one of its ends connected to the junction point 332 and its other end connected to the common bus line 310. The base electrode 335 of transistor 333 is connected to the common junction point 332. A resistor 343 has one of its ends connected to the common junction point 332 and its other end connected to the 6 volt B+ power supply. The transistor 333 performs the function of an amplifier and provides the driving pulses for the ring counter stage 350.

Since the ring counter contains six identical stages and all operate in an identical fashion except their output are dependent on the count number, only one of the stages will be discussed and numbered with the understanding that the other stages operate in a similar fashion.

The ring counter is provided with six stages respectively labeled a through f, each of the stages operating in the same identical fashion as each of the other stages. The first stage of the ring counter 350, contains a first transistor 353 having an emitter electrode 354, a base electrode 355, and a collector electrode 356 connected to one end of resistor 357. The other end of resistor 357 is connected to the 6 volt B+ line. The emitter electrode 354 is connected to one end of a resistor 363 and the other end of the resistor 363 is connected to the common bus line 310. A capacitor 361 has one end connected to the base electrode 255 of transistor 353 and the other end of the capacitor 361 is connected to the collector electrode 356f of stage No. f. The base electrode 355 of transistor 353 is connected to one end of a resistor 365 and the other end of resistor 365 is connected to the common bus electrode 310. A resistor 359 has one of its ends connected to the collector electrode 356 of transistor 353 and its other end connected to the output lead 385 of the first stage. A transistor 367 having an emitter electrode 368, a base electrode 369, and a collector electrode 370 connected to one end of a resistor 371. The other end of resistor 371 is connected to the common bus electrode 310. The collector electrode 370 of transistor 367 is connected to one end of a resistor 375. The other end of the resistor 375 is connected to the base electrode 355 of transistor 353. The base electrode 369 of transistor 357 is connected to one end of resistor 372. The other end of resistor 372 is directly connected to the 6 volt B+ line. A resistor 373 has one of its ends connected to the base electrode 369 of transistor 367 and its other end connected to the collector electrode 356 of transistor 353. The emitter electrode 368 of transistor 367 is connected to the collector electrode 336 of transistor 333. The output of stage a of the ring counter 350 is taken off of line 385, the output of stage b of the ring counter 350 is taken off of lead 386, the output of stage c of the ring counter 350 is taken off of output lead 387, the output of stage d of the ring counter 350 is taken off of line 388, the output of stage e of the ring counter 350 is taken off of the lead 389 and the output of stage f of the ring counter 350 is taken off of line 390.

The operation of the ring counter is as follows:

The oscillator 300 is a free running multivibrator and its frequency is dependent on the voltage appearing between terminals 281 and 291. At the normal set position the output of the oscillator 300 is set to be approximately 146 cycles per second. As the voltage increases between terminals 281 and 291 the frequency of the oscillator increases, and as the voltage decreases between the terminals 281 and 291 the frequency of the oscillator decreases. The output of the free running oscillator is connected to an amplifying transistor 333 which amplifies the oscillating pulses. Capacitor 331, along with resistors 341 and 334 having a small RC time constant differentiate the oscillator output. Resistors 334 and 341 are chosen so that transistor 333 is biased near cut-off. Thus, only one polarity of the differentiated input to transistor 333 appears at its output across resistor 337 across which is developed a large amplitude unidirectional pulse of short time duration.

The amplified oscillator "pulses" are fed to the emitters of the transistors 367, 367b, 367c, 367d, 367e and 367f. The pulse which is supplied to the emitters is in a negative going direction causing the particular transistor of the 368 series which is conducting to become non-conducting. Turning the transistor 367 off supplies a negative-going pulse through the resistor 375 to the base 355 of the appropriate transistor 353. This negative going pulse causes transistor 353 which was conducting to become non-conductive. This causes the collector electrode 356 to go in a positive direction therefore supplying via capacitor 361 a pulse of a positive spike to the next succeeding stage which in turn causes the next succeeding stage to become conductive. Causing the next succeeding stage to become conductive presents an output pulse on the next respective output lead.

Figure 7:
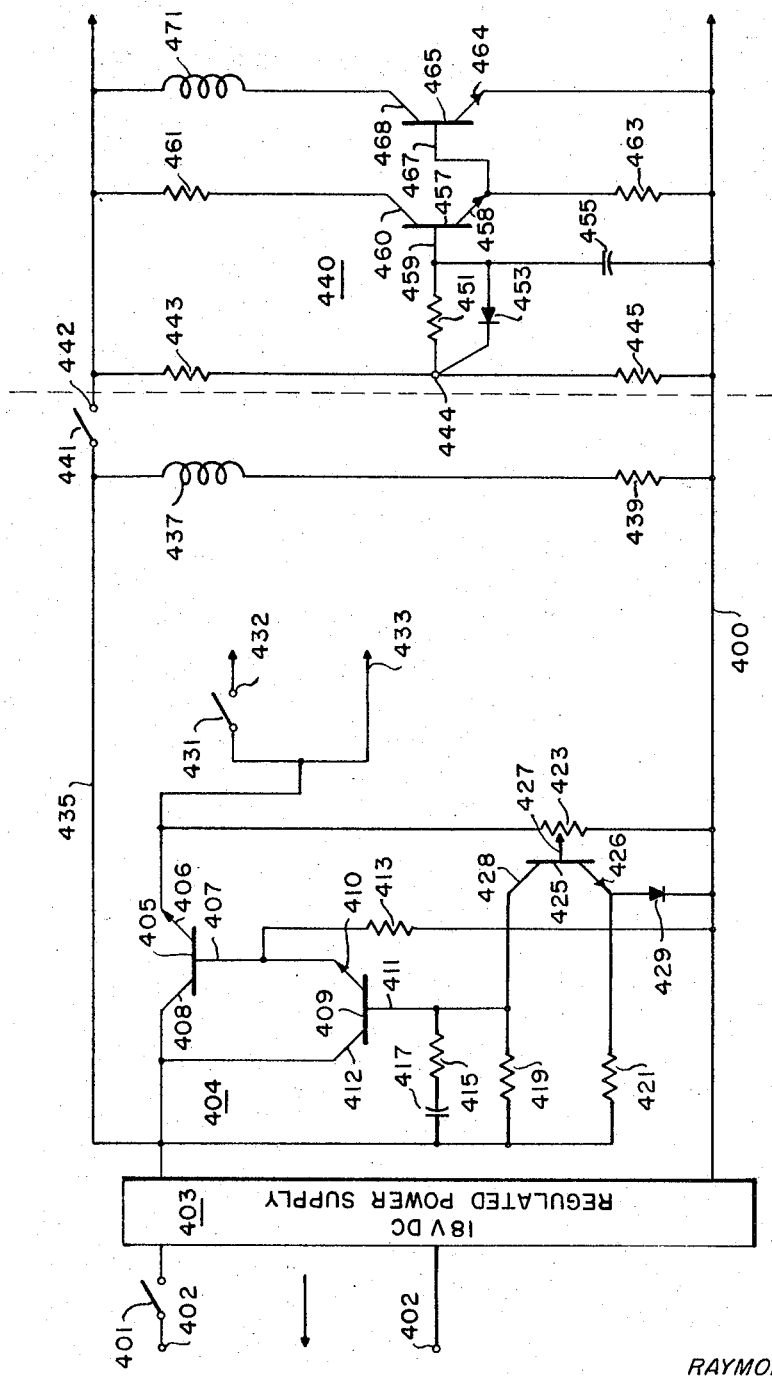
FIG. 7 is a circuit diagram of a suitable DC power supply and voltage regualtors for the motor control signal circuits which are used in a preferred form of the invention.

FIG. 7 illustrates a suitable DC power supply having a pair of AC input terminals 402. A switch 401 is provided for switching the AC power off and on. An 18 volt DC regulated power supply 403 has one of its inputs connected to one of the terminals 402 and its other input connected to the terminal of the switch 401. One of the output leads of the 18 volt DC regulated power supply is connected to the common bus line 400. The other output lead of the DC regulated power supply is connected to the collector 408 of a transistor 405. A transistor 405 is provided with an emitter electrode 406, a base electrode 407, and a collector electrode 408 connected to the other output of the 18 volt DC regulated power supply. The output of the transistor 405 is taken from the emitter electrode 406. A potentiometer 423 is connected between the emitter electrode 406 of transistor 405 and a common bus line 400. A transistor 425 having an emitter electrode 426, a base electrode 427, and a collector electrode 428 has its base electrode 427 connected to the center tap of the potentiometer 423. A transistor 409 has an emitter electrode 410, a base electrode 411, and a collector electrode 412 connected to the collector electrode 408 of transistor 405. Transistors 405 and 409 are connected to form a Darlington pair. The emitter electrode 410 of transistor 409 is connected to the base electrode 407 of transistor 405. Resistor 413 has one of its ends connected to the base electrode 407 of transistor 405 and its other end connected to the common bus line 400. The collector electrode 428 of transistor 425 is connected to the base electrode 411 of transistor 409. The emitter electrode 426 of transistor 425 is connected to the anode of a diode 429. The cathode of diode 429 is connected to the common bus line 400. A resistor 415 has one of its ends connected to the base electrode 411 of the transistor 409 and its other end connected to one of the ends of a capacitor 417. The other end of capacitor 417 is connected to the collector electrode 408 of transistor 405. A resistor 419 has one of its ends connected to the base electrode 411 of transistor 409 and its other end connected to the collector electrode 408 of transistor 405. A resistor 421 has one of its ends connected to the emitter electrode 426 of transistor 425 and its other end connected to the collector electrode 408 of transistor 405. Transistors 405, 409, 425 and their associated components form a 6 volt regulated power supply for supplying the 6 volts DC. Switch number 431 and 441 are both controlled and actuated by relay 437. The output of the switch 431 is taken from a terminal 432 and is connected to the oscillator, ring counter, and bistable circuits. The other output of the 6 volts power supply 433 is connected to the SCR gate driving circuits.

The relay 437 has one of its ends connected to the common bus line 435. The other end of relay 437 is connected to one end of a resistor 439. The other end of the resistor 439 is connected to the common bus line 400. The swtich 441 is connected to terminal 442. A resistor 443 has one of its ends connected to the terminal 442 and its other end connected to a common junction point 444. A resistor 445 has one of its ends connected to the common junction point 444 and its other end connected to the common bus line 400.

A transistor 457 having an emitter electrode 458, a base eletcrode 459, and a collector electrode 460 connected to one end of a resistor 461. The other end of resistor 461 is connected to terminal 442. The emitter electrode 458 of transistor 457 is connected to one end of a resistor 463. The other end of resistor 463 is connected to the common bus electrode 400. A capacitor 455 has one of its ends connected to the base electrode 459 of transistor 457 and its other end connected to the common bus line 400. A diode 453 has its anode connected to the base electrode of transistor 459 and its cathode connected to the common junction point 444. A resistor 451 is connected in parallel with the diode 453. A transistor 465 having an emitter electrode 466, a base electrode 467, and a collector electrode 468 which is connected to one side of a relay solenoid 471. The other side of the relay solenoid 471 is connected to the common bus 442. The emitter electrode 466 of transistor 465 is directly connected to the common bus line 400. The base electrode 467 of transistor 465 is connected to the emitter electrode 458 of transistor 457.

The operation of FIG. 7 is as follows:

An AC potential is placed across terminals 402. The switch 401 is closed thereby supplying power to the 18 volt DC regulated power supply. The power supply produces an 18 volt DC potential. The 18 volts appearing at the output of the power supply 403 is fed into the 6 volt DC regulator 404 which is adjusted to produce a 6 volt regulated output. This is accomplished by adjusting the potentiometer 423 while holding a volt meter between 443 and the common bus line 400. By adjusting the position of the potentiometer 423 you adjust the conductivity of the transistor 425 which in turn controls the potential at the base 411 of transistor 409. As the output on terminals 432 and 433 decreases then the impedance of transistor 425 increases thereby increasing the conductivity or the bias at the base 411 of transistor 409 and on the base 407 of transistor 405. This increase in bias on the basis 405 and 409 increases the conductivity thereby supplying more current to the output terminals 431 and 433. Conversely if the potential at 432 and 433 tends to increase, then the impedance of transistor 425 will tend to decrease thereby placing a smaller bias on transistors 405 and 409. By decreasing the bias the conductivity tends to decrease thereby reducing the output potential available at terminals 432 and 433. In this manner the output potential at terminals 432 and 433 is kept at a constant 6 volts.

A finite time after the 18 volt power supply comes on the relay 437 closes switch 441 and 431. After the switch is closed transistors 457 and 465 become energized. The transistors 457 and 465 form a time delay circuit having an approximate time delay of more than 50 milliseconds, so that the voltage will have a chance to build up on the oscillator ring counter bistable elements and the RC gate driving circuits before the voltage is applied to the SCR inverter which controls the motor.

Figure 8:
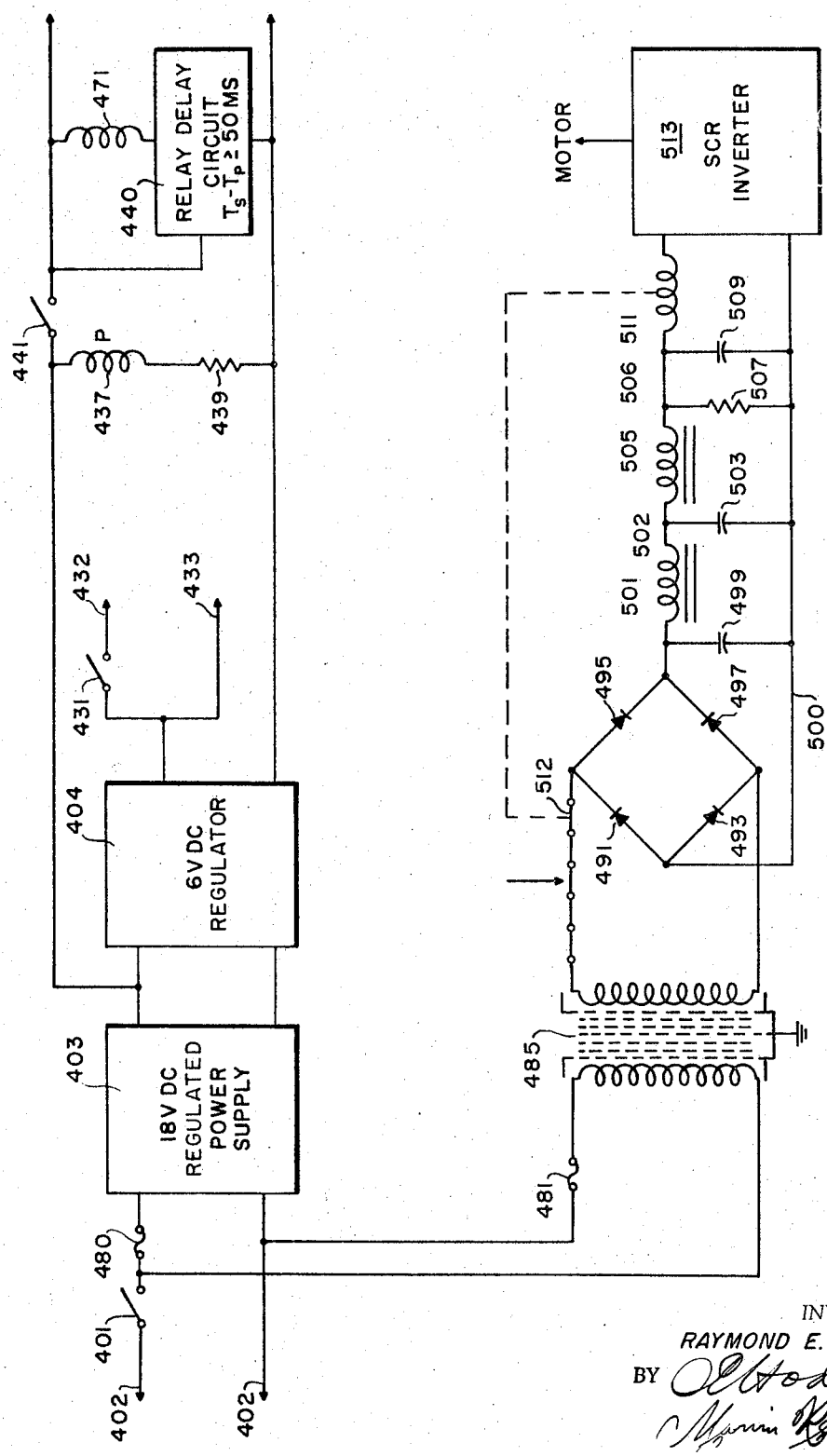
FIG. 8 is a circuit diagram of a suitable DC power supply for the SCR inverter which is used in a preferred form of the invention and a block diagram of the circuits illustrated in FIG. 7.

Referring to FIG. 8 the AC power is applied through a fuse 480 to the 18 volt regulated power supply 403. The AC power is also supplied through a fuse 481 to the primary of a transformer 485. The secondary of transformer 485 is connected to a bridge network 490. A relay switch 489 makes and breaks the contact between the secondary of the transformer 485 and the bridge network 490. The switch 489 is controlled by the relay 471. The bridge network 490 comprises a first diode 491 having its cathode connected to one end of the primary winding having its cathode connected to the output of the relay switch 489. The anode of diode 495 is connected to the cathode of diode 491. The cathode of diode 495 is connected to the cathode of diode 497. The anode of diode 497 is connected to the cathode of diode 493. The anode of diode 493 is connected to the anode of diode 491.

The common bus line 500 is connected to the anodes of diodes 491 and 493. The capacitor 499 has one of its terminals connected to the cathodes of diodes 495 and 497 and its other terminal connected to the common bus line 500. The inductor 501 has one of its ends connected to the cathodes of diodes 495 and 497 and its other end connected to the junction point 502. A capacitor 503 has one of its ends connected to the junction point 502 and its other end connected to the common bus line 500. An inductor 505 has one of its ends connected to the junction point 502 and its other end connected to the junction point 506. A resistor 507 has one of its ends connected to the junction point 506 and its other end connected to the common bus line 500. A capacitor 509 is connected in parallel with the resistor 507. An over-current relay coil 511 is connected between the junction point 506 and one of the inputs of the SCR inverter. The over-current relay coil operates the switch 512. The other input of the SCR inverter circuits is connected to the common bus line 500.

The operation of the circuit of FIG. 8 is as follows:

The AC appearing at terminals 402 is transmitted to the transformer 485 and to the diode bridge network 490. The diode bridge network 490 functions as a full wave rectifier rectifying the AC and placing a positive potential on one side of the capacitor 499 and a negative potential on the common bus line 500 side of the condenser 499. The bridge network builds up the charge on the capacitors 499, 503, and 509. The charge is positive on the end of the capacitors which are away from the common bus line. The inductors 501 and 505 act as filters to eliminate and limit the amount of AC ripple which is present. Note the inductor 511 is an over-current relay coil to prevent a too large a current surge and opens the switch 512 in the event too much current is supplied to the SCR inverter.

Figure 9:
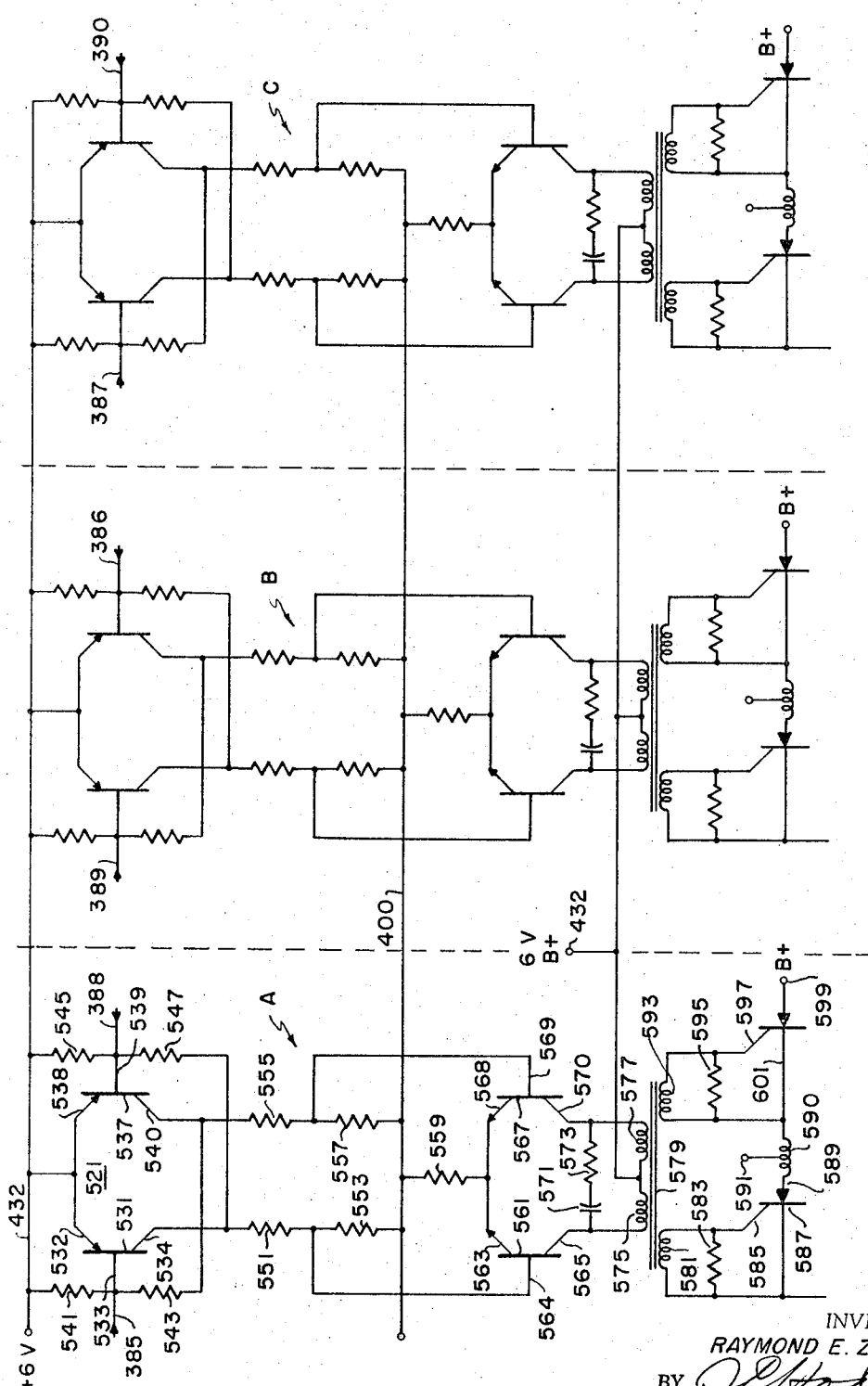
FIG. 9 is a circuit diagram of a suitable SCR gate drive circuit which is used in a preferred form of the invention.
Figure 10:
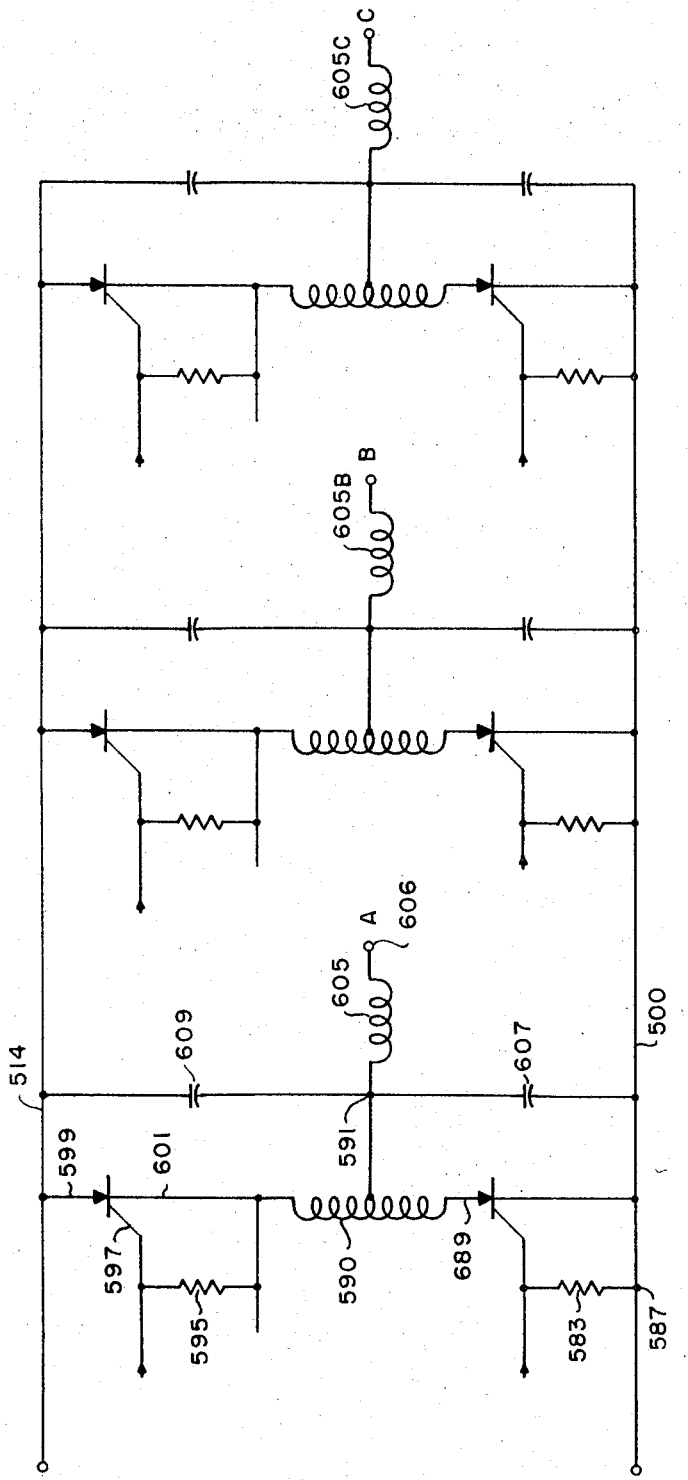
FIG. 10 is a circuit diagram of a suitable three phase SCR bridge inverter which is used in a preferred form of the invention.

Referring to FIGS. 9 and 10 concurrently identical components will have the same reference numerals. Each of the circuits of FIGS. 9 and 10 contain an inverter for generating three phases of the electrical three phase power. Therefore phase A will be generated or controlled by the circuit in the broken line box labeled A, phase B will be generated or controlled by the circuit in the broken line box labeled B and phase C will be generated or controlled by the circuit in the broken line box labeled C. Only the components listed for the box labeled A will be given, however, it is to be understood that the identical components appear in the boxes labeled B and C and function in a similar manner.

The 6 volt power supply is connected to the line 432 of FIG. 7. A transistorized multivibrator 521 has a first transistor 531 having an emitter electrode 532, a base electrode 533, and a collector electrode 534. A second transistor 537 has an emitter electrode 538, a base electrode 539, and a collector electrode 540, electrode 540 being connected to one end of a resistor 543. The other end of resistor 543 is connected to the base electrode 533 of transistor 531. One end of resistor 541 is connected to the base electrode 533 of transistor 531 and the other end of the transistor 541 is connected to the B+ line 432. A resistor 547 has one of its ends connected to the collector electrode 534 of transistor 531 and its other end connected to the base electrode 539 of the transistor 537. The resistor 545 has one of its ends connected to the base electrode 539 of the transistor 537 and its other end connected to the common bus line 432. The emitter electrode 532 of transistor 531 is connected to the emitter electrode 538 of transistor 537 and the two emitters are directly connected to the common bus line 432.

A resistor 551 has one of its ends connected to the collector electrode 534 of transistor 531 and its other end connected to one end of the resistor 553. The other end of resistor 553 is connected to the common bus line 400. A resistor 555 has one of its ends connected to the collector electrode 540 of the transistor 537 and its other end connected to one end of the resistor 557. The other end of the resistor 557 is connected to the common bus line 400.

A first driven transistor 561 having an emitter electrode 563, a base electrode 564 and a collector electrode 565, electrode 565 being connected to one end of a capacitor 571. The other end of the capacitor 571 is connected to one end of a resistor 573. A second driven transistor 567 having an emitter electrode 568, a base electrode 569 and a collector electrode 570 connected to the other end of the resistor 573. The emitter 563 of transistor 561 is connected to the emitter 568 of transistor 567. The emitter 563 of transistor 561 is connected to one end of a resistor 559. The other end of the resistor 559 is connected to the common bus line 400.

One end of a primary winding 575 of transformer 579 is connected to the collector electrode 565 of transistor 561 and the other end of the primary winding is connected to the common bus line 432. One end of the primary winding 577 of transformer 579 is connetced to the collector electrode 570 of transistor 567. The other end of the primary winding 557 is connected to common B+ line 432. A secondary winding 581 of the transformer 579 has one end connected to the control electrode 585 of a SCR 589. The other end of the primary winding 581 is connected to the cathode 587 of the SCR 589.

A resistor 583 is connected in parallel across the secondary transformer winding 581. A secondary transformer winding 593 has one of its ends connected to the cathode of the SCR 601 and its other end connected to the control electrode 597 of the SCR 601. A resistor 595 is connected in parallel with the secondary winding 593 of the transformer 579. An output inductor 590 has one of its ends connected to the anode of the SCR 589 and its other end connected to the cathode of the SCR 601. The winding 590 is provided with a center tap output 591. A source of B+ potential which is taken from the over current relaying coil 511 is applied to terminal 599. One end of the capacitor 607 is connected to the common output point 591 and its other end is connected to common bus line 500. One end of capacitor 609 is connected to the terminal 591 and its other end is connected to the over current relay coil 511. A inductor 605 has one of its ends connected to the common junction 591 and its other end connected to output 606 labeled with A which supplies phase A of the output current.

The operation of the circuits of FIGS. 9 and 10 will be discussed concurrently. In addition, reference will be made to the operation of the ring counter of FIG. 6. The oscillator which produces a pulse frequency of approximately 146 pulses per second has the frequency divided by 6. Each stage of the ring counter puts out the pulse for every six pulses placed on the input of the ring counter. Therefore, the 146 cycle input is reduced to an approximate 25 cycle per second output on each one of the output lines 385 through 390 of the ring counter.

Assuming that the circuit has been in operation for awhile and a steady state condition has been reached, the next pulse on input line 385 into the base electrode 533 of the transistor 531 causes the transistor 531 to become conductive. The previously conducting transistor 537 is caused to become nonconductive by the regenerative action of the interconnected flip-flop. The output of transistor 531 is taken from the common junction point of resistors 551 and 553. When the transistor 531 becomes conductive a positive output pulse is supplied to the base electrode 564 of transistor 561 causing the transistor 561 to become conductive. Transistors 561 and 567 are a push-pull amplifier pair.

It is to be noted that during the operation of the circuit FIGS. 9 and 10, three of the SCR's are continually on and three of the SCR's are continually off. It is essential that the firing of any one SCR should promptly turn off the SCR which appears in series with it across the DC supply. SCR's can be turned off by application of a negative anode-to-cathode voltage. Turnoff spikes of voltage are developed by the center tapped inductor 590 and the capacitors 607 and 609 connected from the inductor center tap to the DC supply buses 500 and 511. Each center tapped inductor acts as an autotransformer. When an SCR turns on, its initial surge goes through one half of the center tapped inductor and through a capacitor to a DC supply terminal. This surge is inverted in the other half of the center tapped inductor to provide a required reversed anode to cathode voltage for turnoff. Returning to the operation of transistor 561, a negative going pulse is generated on a primary winding 575 which in turn causes a negative pulse to be generated in a secondary winding 581 and 593 of transformer 579. The output of the secondary winding 581 of the transformer 579 is supplied to the control electrode 585 causing the SCR 587 to become conductive. The surge caused by the SCR 587 becoming conductive causes the SCR 601 to become nonconductive by the mechanism discussed above.

The waveform from each inductor center tap 591 is basically a square wave but modified by the initial overshoot and by ringing. The initial overshoot is a necessary consequence of turnoff spike generation. The ringing is a consequence of excluding harmonic frequencies from the motor load by the means of series inductors 605B and 605C, and the motor capacitor 701, 702 and 703 illustrated in FIG. 11. It is noted that the switching action of the SCR's tends to produce square waves and the desired motor drive wave form is a sine wave. The circuit utilized allows harmonics generated by the SCR's to be confined to a harmless region. An incidental side effect of the ringing voltage of the center tapped chokes 591A, 591B, 591C is that the SCR's do not necessarily stay on throughout the 180° on period. The ringing can produce negative anode voltages producing early turnoff; however, the gate pulses are sustained for 180°, so that after the negative anode swing disappears the SCR comes on again to finish its intended conduction period. The pattern of this effect varies between motor starting and normal running and motor load. However, it does not interfere with the running of the motor.

The SCR mechanism described above is considered to be quite reliable, however, any occasional turnoff failure that might occur tends to be self-sustaining and would result in a blown power supply fuse if allowed to persist. As a safeguard the over current relay 511 is provided. This relay does not react in normal starting or running, but the excessive current caused by turnoff failure does cause it to pull up and break the circuit. The points of the relay are in the AC supply to the motor drive system and interrupt the power to the inverter if such excessive DC current occurs. When the excessive current decreases then the over current relay releases restoring normal operations. This relay is fast enough to prevent fuse blowing if an SCR fails to turn off.

Figure 11:
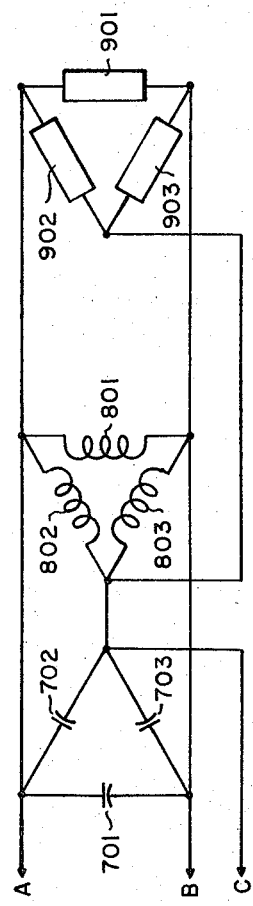
FIG. 11 is a circuit diagram illustrating the connections between the three phase SCR bridge inverter illustrated in FIG. 10 and the motor windings which are used in a preferred form of the invention.

Referring to FIG. 11 the phase A appears on line A, phase B appears on line B, and the phase C appears on line C. Capacitor 701 has one of its ends connected to line A and its other end connected to line B. A capacitor 702 has one of its lines connected to line A and its other end connected to line C. A capacitor 703 has one of its ends connected to line B and its other end connected to line C. The motor winding 801 is connected between lines A and B. Motor winding 802 is connected between lines A and C. Motor winding 803 is connected between lines B and C. A selenium diode called a thyrector supplied by General Electric has the characteristics of having an impedance which decreases as the voltage rises above a given point is placed in parallel across the motor windings as the protective device to protect against surge currents. The selenium diode 901 is connected between lines A and B. The selenium diode 902 is connected between lines A and C. The selenium diode 903 is connected between lines B and C. The operation of the motor is as follows:

The three phase power is supplied to the motor winding from the SCR inverter circuit causing the motor to rotate. The thyrectors protect the windings from any dangerous voltage surges.

Returning to FIG. 1, the voltage controlled oscillator 33 produces 146 pulses per second in its preset state. The frequency of the oscillator is controlled by adjusting the potentiometer. The output pulses trigger the ring counter 35 and produces an output frequency of 25 pulses per second on each output line of the ring counter. The output of the ring counter is fed to the SCR drive circuit 37 for driving the circuits at a rate of 25 cycles per second. The output of the SCR drive circuits are used to control the SCR three phase bridge inverter 39. A rectified source of power is supplied by the rectifier filter network 40 to the SCR phase bridge inverter 30 for switching purposes. The output of the SCR bridge inverter circuit is 25 cycle three phase current which runs the motor at 90 r.p.m. The tone wheel 29 is rotated in unison with the motor and at the desired speed of 90 r.p.m. produces 60 output pulses which compared in the phase comparator with the number of cycles present in the local power source or alternatively by way of switch 23 with the output of a mastertone oscillator. The output of the phase comparator 27 is indicative of whether the motor is running faster than or slower than 90 r.p.m. The output of the phase comparator is then passed through a low pass filter which eliminates the unwanted AC components present on the filter. The output of the low pass filter 31 is a DC voltage which is utilized to control the voltage controlled oscillator 33. If the motor increases in speed this output voltage decreases so as to cause the oscillator 33 to oscillate at a lower frequency. However, if the motor is running at a speed of less than 90 r.p.m. then the low pass filters output voltage increase causing the voltage control oscillator frequency to increase. By increasing the frequency of the output of the oscillator the frequency of the ring counter and the SCR drive circuit is increased thereby increasing the cycles per second generated by the three phase SCR bridge inverter circuit 39. Increasing the frequency of the three phase inverter increases the speed of the 90 r.p.m. motor conversely decreasing the frequency of the three phase bridge inverter decreases the speed of the motor 41.

By way of illustration only and not for purposes of limitation the value of the components utilized to build a laboratory embodiment of the invention are listed below.

Resistor:

| | |
|---|---|
| 55 | 1K ohms. |
| 67 | 100K ohms. |
| 69 | 10K ohms. |
| 70 | 8.2K ohms. |
| 71 | 470 ohms. |
| 103 | [R103 and C119 are chosen experimentally to reduce RF noise]. |
| 113 | 15K ohms. |
| 115 | 4.7K ohms. |
| 123 | 220 ohms. |
| 137 | 15K ohms. |
| 139 | 4.7K ohms. |
| 150 | 330 ohms. |
| 167 | 1K ohms. |
| 169 | 1K ohms. |
| 183 | 1K ohms. |
| 185 | 1K ohms. |
| 201 | 10K ohms. |
| 203 | 4.7K ohms. |
| 205 | 2.2K ohms. |
| 211 | 1K ohms. |
| 219 | 1K ohms. |
| 225 | 1K ohms. |
| 227 | 10K ohms. |
| 229 | 15K ohms. |
| 231 | 10K ohms. |
| 235 | 1K ohms. |
| 249 | 1K ohms. |
| 255 | 10 ohms. |
| 265 | 1.35K ohms. |
| 267 | 2.7K ohms. |
| 269 | 2.7K ohms. |
| 279 | 1K ohms. |
| 289 | 10K ohms. |

Resistor:

| | |
|---|---|
| 311 | 270 ohms. |
| 312 | 4.7K ohms. |
| 313 | 2.70 ohms. |
| 315 | 4.7K ohms. |
| 316 | 1K ohms. |
| 323 | 1K ohms. |
| 324 | 3.3K ohms. |
| 325 | 33K ohms. |
| 337 | 1K ohms. |
| 339 | 27 ohms. |
| 341 | 4.7K ohms. |
| 343 | 47K ohms. |
| 357 | 22K ohms. |
| 359 | 47K ohms. |
| 363 | 2.2K ohms. |
| 365 | 27K ohms. |
| 371 | 15K ohms. |
| 372 | 27K ohms. |
| 373 | 27K ohms. |
| 375 | 27K ohms. |
| 413 | 2.7K ohms. |
| 415 | 470 ohms. |
| 419 | 4.7K ohms. |
| 421 | 421 ohms. |
| 443 | 10K ohms. |
| 445 | 6.8K ohms. |
| 451 | 220K ohms. |
| 461 | 2.2K ohms. |
| 463 | 4.7K ohms. |
| 507 | 15K 10 watts. |
| 541 | 4.7K ohms. |
| 543 | 47K ohms. |
| 545 | 4.7K ohms. |
| 547 | 47K ohms. |
| 551 | 2.2K ohms. |
| 553 | 2.7K ohms. |
| 555 | 2.2K ohms. |
| 557 | 2.7K ohms. |
| 559 | 10 ohms. |
| 573 | 1K ohms. |
| 583 | 1K ohms. |
| 595 | 1K ohms. |

Capacitor:

| | |
|---|---|
| 61 | 10 µf. |
| 73 | 10 µf. |
| 105 | 25 µf. |
| 119 | [R103 and C119 chosen experimentally to reduce RF noise]. |
| 121 | 100 µf. |
| 135 | 25 µf. |
| 145 | [C145 chosen experimentally to reduce RF noise]. |
| 149 | 100 µf. |
| 170 | 2 µf. |
| 233 | 25 µf. |
| 239 | .5 µf. |
| 261 | .5 µf. |
| 263 | .5 µf. |
| 270 | 1 µf. |
| 317 | 1 µf. |
| 321 | .1 µf. |
| 331 | .01 µf. |
| 261a–f | .005 µf. |
| 417 | .01 µf. |
| 455 | 1 µf. |
| 499 | 500 µf. 200 v. DC. |
| 503 | 500 µf. 200 v. DC. |
| 509 | 1000 pf. 200 v. DC. |
| 571 | 1 µf. |
| 607 | 10 µf. |
| 609 | 10 µf. |
| 701 | 30 µf. |
| 702 | 30 µf. |
| 703 | 30 µf. |

Transistor:

| | |
|---|---|
| 63 | 2N697. |
| 109 | 2N697. |
| 141 | 2N697. |
| 207 | 2N697. |
| 215 | 2N697. |
| 221 | 2N404. |
| 241 | 2N697. |
| 245 | 2N697. |
| 251 | 2N404. |
| 271 | 2N697. |
| 275 | 2N697. |
| 283 | 2N404. |
| 301 | 2N697. |
| 307 | 2N697. |
| 333 | 2N697. |
| 363a–f | 2N697. |
| 367a–f | 2N404. |
| 405 | 2N424. |
| 409 | 2N697. |
| 425 | 2N697. |
| 457 | 2N697. |
| 465 | 2N697. |
| 531 | 2N404. |
| 537 | 2N404. |
| 561 | 2N697. |
| 567 | 2N697. |
| SCR 587 | 2N1777A. |
| SCR 601 | 2N1777A. |

Diodes:

| | |
|---|---|
| 57 | 1N457. |
| 59 | 1N457. |
| 75 | 1N457. |
| 77 | 1N457. |
| 79 | 1N457. |
| 80 | 1N457. |
| 167 | 1N457. |
| 165 | 1N457. |
| 179 | 1N457. |
| 181 | 1N457. |
| 429 | 1N457. |
| 453 | 1N457. |
| 491 | 1N1204A. |
| 493 | 1N1204A. |
| 495 | 1N1204A. |
| 497 | 1N104A. |

Potentiometer:

| | |
|---|---|
| 133 | 10K ohms. |
| 171 | 10K ohms. |
| 202 | 1K. |
| 423 | 1K. |

Obviously many modifications and variations of the present invention are possible in the light of the above teachings. It is therefore to be understood that within the scope of the appended claims the invention may be practiced otherwise than as specifically described.

What is claimed is:

1. A speed control system for a frequency responsive motor, said motor being a three phase induction motor, the speed of which varies with the frequency of the applied power, said system comprising:

means generating a signal having a frequency which is dependent on the rotational speed of said motor coupled to said motor, said signal generating means having an output;

a standard frequency source having an output;

comparator means for comparing the signal produced by the standard frequency source with the signal generated by said signal generating means, said comparator means having a pair of inputs and an output, and said comparator means producing a direct current voltage signal which is indicative of the change of the speed of said three phase motor, said output of said standard frequency source being connected to one of said comparator inputs, said output of said signal generating means connected to the other one of said inputs;

filter means for eliminating the unwanted alternating current components which may be present in the output of said comparator means, said filter means having an output and an input connected to said comparator output;

voltage controlled oscillator means for generating a three phase alternating current voltage whose frequency is dependent on the value of a direct current voltage said three phase generating means having an output and an input connected to the output of said filter means, said output of said three phase generating means connected to said motor;

means for converting direct current power into three phase alternating current power having a pair of inputs and an output, one of said inputs of said power converting means coupled to said voltage controlled oscillator means;

a source of direct current power connected to the other one of said inputs of said power converting means;

said filter means comprising:

a first, second and third transistor, each having a base electrode, an emitter electrode and a collector electrode, the input to said filter means being connected to said base electrode of said first transistor said emitter electrode of said first transistor being connected to said collector electrode of said second transistor electrode of said third transistor being connected to said collector electrode of said first transistor, said collector electrode of said third transistor being connected to said base electrode of said second transistor;

fourth, fifth and sixth transistors each having a base electrode, emitter electrode and collector electrode;

resistance/capacitance filter means connected between said emitter electrode of said first transistor and the said base electrode of said fourth transistor, said emitter electrode of said fourth transistor being connected to said collector electrode of said fifth transistor, said emitter electrode of said sixth transistor being connected to said collector electrode of said fourth transistor, said collector electrode of said sixth transistor being connected to said base electrode of said fifth transistor;

seventh, eighth and ninth transistors each having a base electrode, emitter electrode and collector electrode; and T-notch filter means having an input and an output being connected to the base electrode of said seventh transistor, the input of said T-notch filter means being connected to the emitter electrode of said fourth transistor, said emitter electrode of said ninth transistor being connected to said collector electrode of said seventh transistor, said collector electrode of said eighth transistor being connected to said emitter electrode of said seventh transistor and said collector electrode of said ninth transistor being connected to said base electrode of said eighth transistor;

whereby the speed of the motor is accurately controlled.

2. A speed control system for a frequency responsive motor as defined in claim 1 but further characterized by said filter means comprising:

a first, second and third transistor each having a base electrode, an emitter electrode and a collector electrode, the input to said filter means being connected to said base electrode of said first transistor, said emitter electrode of said first transistor being connected to said collector electrode of said second transistor, said emitter electrode of said third transistor being connected to said collector electrode of said first transistor, said collector electrode of said third transistor being connected to said base electrode of said second transistor;

fourth, fifth and sixth transistors each having a base electrode, emitter electrode and collector electrode;

resistance/capacitance filter means connected between said emitter electrode of said first transistor and the said base electrode of said fourth transistor, said emitter electrode of said fourth transistor being connected to said collector electrode of said fifth transistor, said emitter electrode of said sixth transistor being connected to said collector electrode of said fourth transistor, said collector electrode of said sixth transistor being connected to said base electrode of said fifth transistor;

seventh, eighth and ninth transistors each having a base electrode, emitter electrode and collector electrode; and T-notch filter means having an input and an output being connected to the base electrode of said seventh transistor, the input of said T notch filter means being connected to the emitter electrode of said fourth transistor, said emitter electrode of said ninth transistor being connected to said collector electrode of said seventh transistor, said collector electrode of said eighth transistor being connected to said emitter electrode of said seventh transistor and said collector electrode of said ninth transistor being connected to said base electrode of said eighth transistor.

3. A speed control system for frequency responsive motors comprising:

a motor the speed of which varies with the frequency of the power applied thereto;

means coupled to said motor for generating a signal having a frequency which is dependent on the rotational speed of said motor, said means having an output terminal;

a standard frequency source having an output;

comparator means for comparing the signal produced by the standard frequency source with the signal produced by said signal generating means;

said comparator means having a pair of inputs and an output and said comparator means producing a direct current voltage signal which is indicative of the change of the speed of said motor, said output of said standard frequency source being connected to one of said comparator inputs, said output of said signal generating means being connected to the other one of said inputs;

filter means for eliminating the unwanted alternating current components which may be present in the output of said comparator means, said filter means having an output and an input connected to said comparator output; and means for generating an alternating current voltage, the frequency of which is dependent on the value of a direct current voltage, said alternating current generating means having an output and an input connected to the output of said filter means, said output alternate current generating means being connected to said motor;

said alternating current generating means comprising:

a voltage controlled oscillator means having an output;

means for converting direct current power into alternating current power, said converting means having a pair of inputs and an output, one of said inputs of said power converting means being coupled to said voltage controlled oscillator means; and a source of direct current power connected to the other one of said inputs of said power converting means for converting direct current power into alternating current power;

said filter means comprising:

a first, second and third transistor each having a base electrode, an emitter electrode and a collector electrode, the input to said filter means being connected to said base electrode of said first transistor, said emitter electrode of said first transistor being connected to said collector electrode of said second transistor, said emitter electrode of said third transistor being connected to said collector electrode of said first transistor, said collector electrode of said third transistor being connected to said base electrode of said second transistor;

fourth, fifth and sixth transistors each having a base electrode, emitter electrode and collector electrode;

resistance/capacitance filter means connected between said emitter electrode of said first transistor and the said base electrode of said fourth transistor, said emitter electrode of said fourth transistor being connected to said collector electrode of said fifth transistor, said emitter electrode of said sixth transistor being connected to said collector electrode of said fourth transistor, said collector electrode of said sixth transistor being connected to said base electrode of said fifth transistor;

seventh, eighth and ninth transistors each having a base electrode, emitter electrode and collector electrode; and T-notch filter means having an input and an output being connected to the base electrode of said seventh transistor, the input of said T notch filter means being connected to the emitter electrode of said fourth transistor, said emitter electrode of said ninth transistor being connected to said collector electrode of said seventh transistor, said collector electrode of said eighth transistor being connected to said emitter electrode of said seventh transistor and said collector electrode of said ninth transistor being connected to said base electrode of said eighth transistor;

whereby the speed of the motor is accurately controlled.

4. A speed control system for a frequency responsive motor, said motor being a three phase induction motor the speed of which varies with the frequency of the applied power, said system comprising:

means generating a signal having a frequency which is dependent on the rotational speed of said motor, said signal generating means being coupled to said motor and having an output;

a standard frequency source having an output;

comparator means for comparing the signal produced by the standard frequency source with the signal generated by the signal generating means, said comparator means having a pair of inputs and an output said comparator means producing a direct current voltage signal which is indicative of the change of the speed of said three phase motor, said output of said standard frequency source being connected to one of said comparator inputs said output of said signal generating means being connected to the other one of said inputs;

filter means for eliminating the unwanted alternate current components present in the output of said comparator, said filter means having an output and an input connected to said comparator output;

a voltage controlled oscillator having an output and an input connected to said output of said filter means;

a ring counter having six stages, each of said stages having an output and said ring counter having a common input connected to said output of said voltage controlled oscillator;

three bistable flip-flops each having a pair of outputs and a pair of inputs, each of said flip-flops inputs being connected to a respective ring counter stage output; and three phase power inverter means having a three phase output and six inputs, each of said three phase inverter inputs being coupled to a respective flip-flop output whereby a three phase power is generated having an accurately controlled frequency, said three phase power being supplied to said three phase motor.

5. A speed control system for a frequency responsive motor as defined in claim 4 but further characterized by having said three phase inverter comprising:

means for generating a first phase of electrical power comprising a first and a second SCR each having an anode, cathode and control electrode;

a first center tapped inductor having one of its ends being connected to said first SCR's cathode and its other end being connected to said second SCR's anode;

a first phase output terminal;

a first inductor having one of its ends connected to said first tapped inductor's center tap and its other end connected to said first phase output terminal;

said first SCR's control electrode being coupled to said first bistable flip-flops first output and said second SCR's control electrode being coupled to said first bistable flip-flop's second output;

means for generating a second phase of electrical power comprising a third and fourth SCR, each having an anode and control electrode;

a second tapped inductor having one of its ends being connected to said third SCR's cathode and its other end being connected to said fourth SCR's anode;

a second phase output terminal;

a second inductor having one of its ends connected to said second center tapped inductor's center top and its other end connected to said second phase output terminal;

said third SCR's control electrode being coupled to said second bistable flip-flop's first output and said fourth SCR's control electrode being coupled to said second bistable flip-flop's second output;

means for generating a third phase of electrical power comprising a fifth and sixth SCR each having an anode, cathode and control electrode;

a third center tapped inductor having one of its ends being connected to said fifth SCR's cathode and its other end being connected to said sixth SCR's anode;

a third phase output terminal;

a third inductor having one of its ends connected to said third center tapped inductor's center top and its other end connected to said third phase output terminal; and said fifth SCR's control electrode being coupled to said third bistable flip-flop's first output and said second SCR's control electrode being coupled to said third bistable flip-flop's second output.

6. A speed control system for a frequency responsive motor as defined in claim 5 but further characterized by having:

a first capacitor being connected between said first SCR's anode and said first center tapped inductor's center tap;

a second capacitor being connected between said second SCR's cathode and said first center tapped inductor's center tap;

a third capacitor being connected between said third SCR's anode and said center tapped inductor's center tap;

a fourth capacitor being connected between said fourth SCR's cathode and said second center tapped inductor's center top;

a fifth capacitor being connected between said fifth SCR's anode and said third center tapped inductor's center tap; and a sixth capacitor being connected between said sixth SCR's cathode and said third center tapped inductor's center tap.

7. A speed control system for a frequency responsive motor as defined in claim 6, but further characterized by said filter means comprising:

a first, second and third transistor each having a base electrode, an emitter electrode and a collector electrode, the input to said filter means being connected to said base electrode of said first transistor, said emitter electrode of said first transistor being connected to said collector electrode of said second transistor, said emitter electrode of said third transistor being connected to said collector electrode of said first transistor, said collector electrode of said third transistor being connected to said base electrode of said second transistor;

fourth, fifth and sixth transistors each having a base electrode, emitter electrode and collector electrode;

resistance/capacitance filter means connected between said emitter electrode of said first transistor and the said base electrode of said fourth transistor, said emitter electrode of said fourth transistor being connected to said collector electrode of said fifth transistor, said emitter electrode of said sixth transistor being connected to said collector electrode of said fourth transistor, said collector electrode of said sixth transistor being connected to said base electrode of said fifth transistor;

seventh, eighth and ninth transistors each having a base electrode, emitter electrode and collector electrode; and T-notch filter means having an input and an output being connected to the base electrode of said seventh transistor, the input of said T notch filter means being connected to the emitter electrode of said fourth transistor, said emitter electrode of said ninth transistor being connected to said collector electrode of said seventh transistor, said collector electrode of said eighth transistor being connected to said emitter electrode of said seventh transistor and said collector electrode of said ninth transistor being connected to said base electrode of said eighth transistor.

8. A speed control system for a frequency responsive motor as defined in claim 5, but further characterized by said filter means comprising:

a first, second and third transistor, each having a base electrode, an emitter electrode and a collector electrode, the input to said filter means being connected to said base electrode of said first transistor, said emitter electrode of said first transistor being connected to said collector electrode of said second transistor, said emitter electrode of said third transistor being connected to said collector electrode of said first transistor, said collector electrode of said third transistor being connected to said base electrode of said second transistor;

fourth, fifth and sixth transistors each having a base electrode, emitter electrode and collector electrode;

resistance/capacitance filter means connected between said emitter electrode of said first transistor and the said base electrode of said fourth transistor, said emitter electrode of said fourth transistor being connected to said collector electrode of said fifth transistor, said emitter electrode of said sixth transistor being connected to said collector electrode of said fourth transistor, said collector electrode of said sixth transistor being connected to said base electrode of said fifth transistor;

seventh, eighth and ninth transistors each having a base electrode, emitter electrode and collector electrode; and T-notch filter means having an input and an output being connected to the base electrode of said seventh transistor, the input of said T-notch filter means being connected to the emitter electrode of said fourth transistor, said emitter electrode of said ninth transistor being connected to said collector electrode of said seventh transistor, said collector electrode of said eighth transistor being connected to said emitter electrode of said seventh transistor and said collector electrode of said ninth transistor being connected to said base electrode of said eighth transistor.

9. A speed control system for a frequency responsive motor as defined in claim 4 but further characterized by said filter means comprising:

a first, second and third transistor each having a base electrode, an emitter electrode and a collector electrode, the input to said filter means being connected to said base electrode of said first transistor, said emitter electrode of said first transistor being connected to said collector electrode of said second transistor, said emitter electrode of said third transistor being connected to said collector electrode of said first transistor, said collector electrode of said third transistor being connected to said base electrode of said second transistor;

fourth, fifth and sixth transistors each having a base electrode, emitter electrode and collector electrode;

resistance/capacitance filter means connected between said emitter electrode of said first transistor and the said base electrode of said fourth transistor, said emitter electrode of said fourth transistor being connected to said collector electrode of said fifth transistor, said emitter electrode of said sixth transistor being connected to said collector electrode of said fourth transistor, said collector electrode of said sixth transistor being connected to said base electrode of said fifth transistor;

seventh, eighth and ninth transistors each having a base electrode, emitter electrode and collector electrode; and T-notch filter means having an input and an output being connected to the base electrode of said seventh transistor, the input of said T-notch filter means being connected to the emitter electrode of said fourth transistor, said emitter electrode of said ninth transistor being connected to said collector electrode of said seventh transistor, said collector electrode of said eighth transistor being connected to said emitter electrode of said seventh transistor and said collector electrode of said ninth transistor being connected to said base electrode of said eighth transistor.

10. A speed control system for a frequency responsive motor comprising:

three phase motor means;

an oscillator having an output;

a ring counter having six stages, each of said stages having an output and said ring counter having a common input connected to said oscillator's output;

three bistable flip-flops each having a pair of outputs and a pair of inputs each of said flip-flops inputs connected to a respective ring counter stage output; and three phase power inverter means having a three phase output and six inputs, each of said three phase inverter inputs being coupled to a respective flip-flop output whereby a three phase power is generated having a controlled frequency;

said generated three phase power being supplied to said three phase motor;

said oscillator being controlled by the rotational speed of said motor means.

11. A motor speed control system as defined in claim 10 but further characterized by having said three phase inverter comprising:

means for generating a first phase of electrical power comprising a first and a second SCR each having an anode, cathode and control electrode;

a first center tapped inductor having one of its ends being connected to said first SCR's cathode and its other end being connected to said second SCR's anode;

a first phase output terminal;

a first inductor having one of its ends connected to said first tapped inductor's center tap and its other end connected to said first phase output terminal;
said first SCR's control electrode being coupled to said first bistable flip-flop's first output and said second SCR's control electrode being coupled to said first bistable flip-flop's second output;
means for generating a second phase of electrical power comprising a third and fourth SCR, each having an anode and control electrode;
a second center tapped inductor having one of its ends connected to said third SCR's cathode and its other end being connected to said fourth SCR's anode;
a second phase output terminal;
a second inductor having one of its ends connected to said second center tapped inductor's center top and its other end connected to said second phase output terminal;
said third SCR's control electrode being coupled to said second bistable flip-flop's first output and said fourth SCR's control electrode being coupled to said second bistable flip-flop's second output;
means for generating a third phase of electrical power comprising a fifth and sixth SCR each having an anode, cathode and control electrode;
a third center tapped inductor having one of its ends being connected to said fifth SCR's cathode and its other end being connected to said sixth SCR's anode;
a third phase output terminal;
a third inductor having one of its ends connected to said third center tapped inductor's center top and its other end connected to said third phase output terminal; and
said fifth SCR's control electrode being coupled to said third bistable flip-flop's first output and second SCR's control electrode being coupled to said third bistable flip-flop's second output.

12. A motor speed control system as defined in claim 11 but further characterized by having:
a first capacitor being connected between said first SCR's anode and said first center tapped inductor's center tap;
a second capacitor being connected between said second SCR's cathode and said first center tapped inductor's center tap;
a third capacitor being connected between said third SCR's anode and said second center tapped inductor's center tap;
a fourth capacitor being connected between said fourth SCR's cathode and said second center tapped inductor's center tap;
a fifth capacitor being connected between said fifth SCR's anode and said third center tapped inductor's center tap; and
a sixth capacitor being connected between said sixth SCR's cathode and said third center tapped inductor's center tap.

References Cited
UNITED STATES PATENTS

| | | | |
|---|---|---|---|
| 2,516,308 | 7/1950 | Forrester et al. | 318—231 X |
| 2,714,697 | 8/1955 | Small | 318—231 |
| 2,784,365 | 3/1957 | Fenemore | 318—227 X |
| 3,127,547 | 3/1964 | Biringer et al. | 318—231 X |

ORIS L. RADER, *Primary Examiner.*

G. Z. RUBINSON, *Assistant Examiner.*